Nov. 19, 1963 E. D. TROM 3,111,399
FORCED AIR-DRIVEN ROTARY GRAIN DISTRIBUTOR
Filed Dec. 16, 1960 2 Sheets-Sheet 1
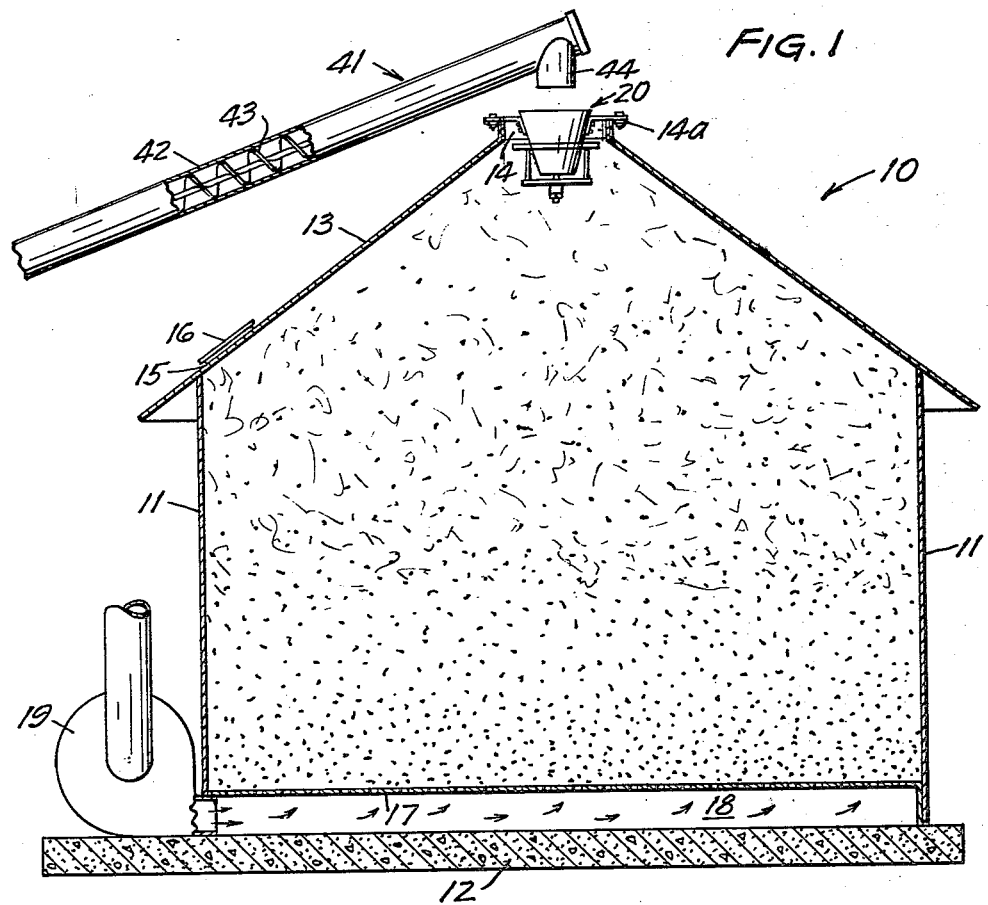
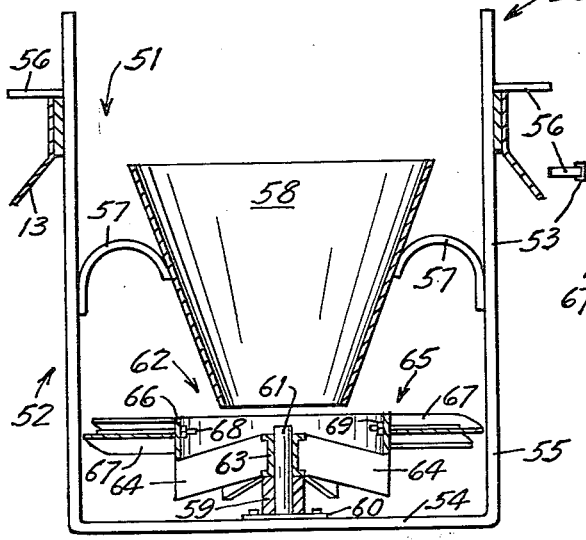
INVENTOR
EUGENE D. TROM
BY Williamson & Palmatier
ATTORNEYS Nov. 19, 1963          E. D. TROM          3,111,399
FORCED AIR-DRIVEN ROTARY GRAIN DISTRIBUTOR
Filed Dec. 16, 1960          2 Sheets-Sheet 2
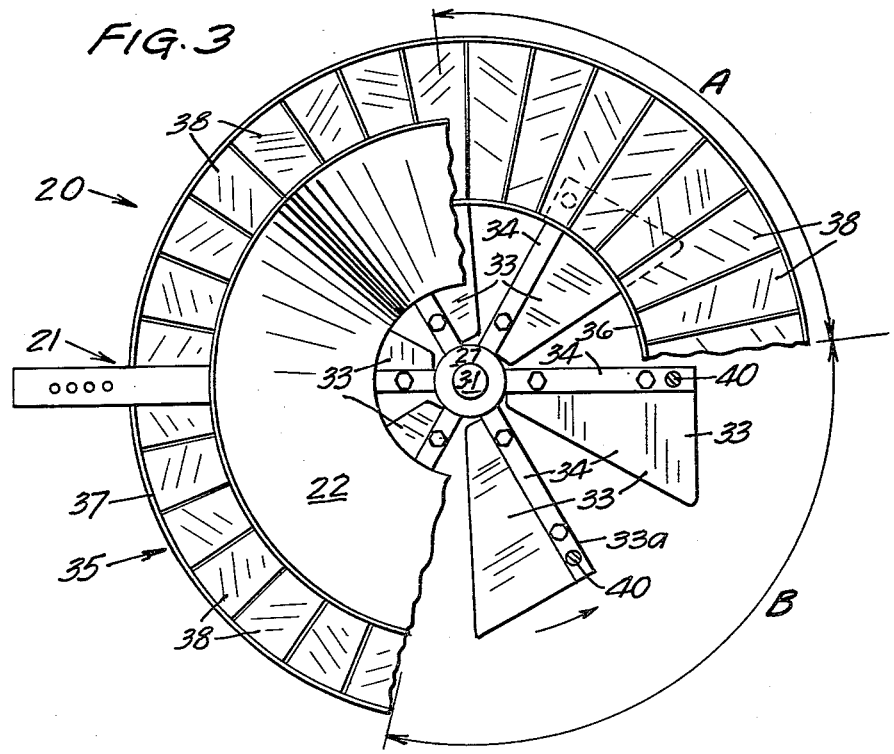
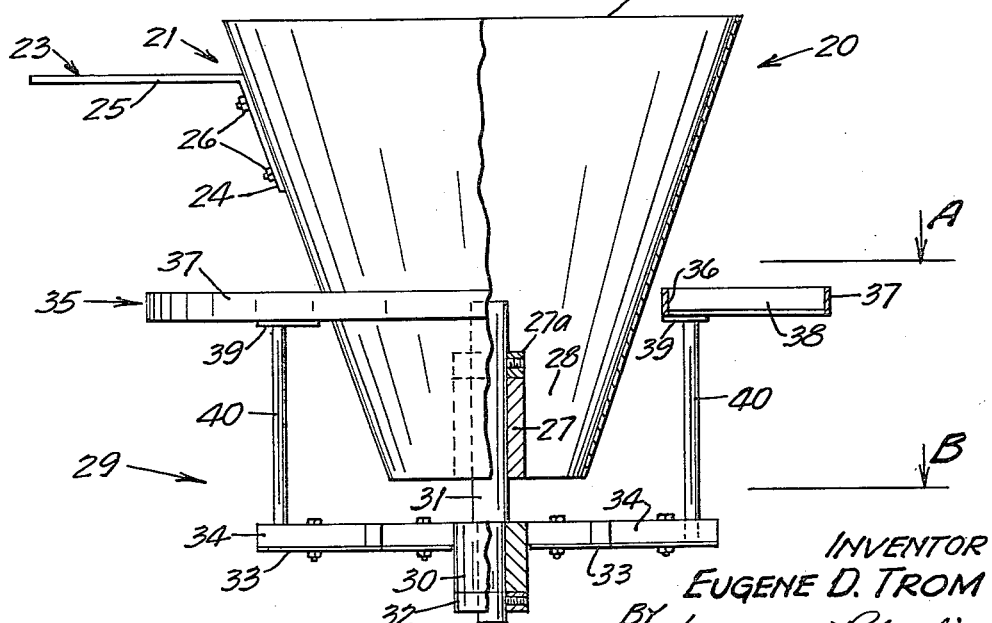
INVENTOR
EUGENE D. TROM
BY Williamson & Palmatier
ATTORNEYS

United States Patent Office 3,111,399
Patented Nov. 19, 1963

3,111,399
FORCED AIR-DRIVEN ROTARY GRAIN
DISTRIBUTOR
Eugene D. Trom, Blooming Prairie, Minn., assignor to
General Equipment Co., Owatonna, Minn., a corporation of Minnesota
Filed Dec. 16, 1960, Ser. No. 76,290
7 Claims. (Cl. 34—59)

This invention relates to material distributing apparatus for use in effecting even distribution of a material into a receptacle and more particularly this invention relates to a rotary distributing apparatus with conventional drying and storage receptacles such as grain bins and which serves to cause even distribution of the material into the bin during the loading thereof.

An object of this invention is to provide a novel forced air-driven rotary distributing apparatus, of simple and inexpensive construction, for use in effecting wide spread and even distribution of a particulate material throughout the interior of a bulk receiver.

Another object of this invention is the provision in a conventional drying and storage receptacle, of the type having a blower mechanism for drying material within the receptacle, with a novel and improved air-driven rotary distributing apparatus for effecting wide spread and even distribution of the material throughout the interior of the receptacle, and which utilizes as its source of rotary power the stream of heated air generated by the blower mechanism.

A more specific object of this invention is to provide a novel forced air-driven rotary grain distributor for use in effecting even distribution of the grain into a conventional storage and drying receptacle, the rotary grain distributor including a fan mechanism for causing rotation thereof and which utilizes as its driving power the stream of heated air present in conventional storage and drying receptacles, the grain distributor being disposed closely adjacent the material inlet of the receptacle for causing cleaning of the grain during loading and distribution thereof.

These and other objects and advantages of my invention will more fully appear from the following description made in connection with the accompanying drawing wherein like character references refer to the same or similar parts throughout the several views, and in which:

FIG. 1 is a vertical sectional view of the conventional drying and storage receptacle in which one embodiment of my invention is incorporated;

FIG. 2 is a vertical cross-sectional view on an enlarged scale of the embodiment of my invention illustrated in FIG. 1;

FIG. 3 is a top plan view of my invention with parts thereof broken away along the different elevational planes to show structure at planes A and B;

FIG. 4 is a vertical section of a different embodiment of my invention; and

FIG. 5 is a top plan view of the embodiment illustrated in FIG. 4.

Referring now to the drawings, and more specifically to FIGS. 1 to 3, it will be seen that one embodiment of my novel rotary material distributor is shown mounted in a conventional bulk receiver such as a grain bin or the line designated in its entirety by the reference numeral 10. The receptacle or grain bin 10 is provided with upstanding peripheral walls 11 which extend upwardly from a base 12 and which are provided with a suitable roof 13, the latter having a centrally located grain inlet 14 formed therein. The grain bin 10 is also provided with an access opening 15 formed in the roof 13 thereof and closed by a conventional hinge door structure 16. Access opening 15 permits ready access to the interior of the bin for the purposes of inspection and the like.

In order to continuously dry the particulate material such as grains and solids and the like being fed into the storage bin, the receptacle is provided with a perforate floor or false bottom 17 spaced above the base 12 to thereby define an air chamber 18. A blower mechanism 19 is arranged in communicating relation with the chamber 18 and produce a continuous stream of heated air which is directed to the chamber 18 upwardly through the interior of the bin 10 and thereafter is discharged through the material inlet 14.

In order to effect even distribution of material fed into conventional storage drying receptacles, a material distributor is also provided adjacent the inlet and usually includes a rotary bladed device which through the action of centrifugal force spreads the particulate material throughout the interior of the bin or receptacle. Most of the conventional distributing apparatus are provided with prime movers for producing or imparting rotary motion to the distributing elements and the prime movers are usually in the form of electric motors which render the distributor apparatus cumbersome and expensive. Early attempts to provide an economical material distributor utilized the downwardly flowing stream of air and material fed into the receptacle during the loading operation as a source of power to operate the rotary distributor. These types of devices failed to perform in a desirable manner. To this end, I have provided a rotary material distributor apparatus which is not only of simple and inexpensive construction but also operates in a more efficient and economical manner than any heretofore known comparable devices.

The embodiment of my distributor apparatus illustrated in FIGS. 1 to 3 and designated in its entirety by the reference numeral 20 is comprised of a support 21 including an inverted, substantially frusto-conically shaped material receiving and guiding structure 22. The material receiving and guiding structure 22 is provided with a plurality of substantially L-shaped brackets 23 secured thereto in circumferentially spaced relation and each of the brackets 23 includes a relative short arm 24 and a longer arm 25. The shorter arm 24 of each of the brackets 23 is detachably connected to the frusto-conical material receiving and guiding structure 22 by means of a nut and bolt assembly 26.

The longer arm 25 is also provided with a plurality of apertures for permitting attachment of the arms to the horizontally disposed flanges 14a of the material inlet 14. The provision of a plurality of apertures in arm 25 permits the apparatus to be accommodated by bins wherein the size of the material inlet varies. A small hub 27 is positioned within the material receiving and guiding structure 22 adjacent the lower, smaller end thereof and is secured therein by means of a plurality of spiders or spokes radiating outwardly from the hub and being rigidly interconnected to the inner wall surfaces of the frusto-conical member. A rotor mechanism 29 is positioned below the material guiding and receiving structure 22 and includes a hub 30 rotatably journaled on a vertically extending shaft 31, as best seen in FIG. 2. It will be noted that shaft 31 extends axially through the hub 27 and is fixedly connected thereto by means of a pin 27. The hub 30 of the rotor mechanism 29 is held in coaxial relation on shaft 31 by means of a collar 32.

The rotor mechanism 29 includes a plurality of substantially flat horizontally disposed blades 33 which are rigidly connected to and extend radially outwardly from the hub 30, the blades being positioned in close proximity to the lower discharge end of the material receiving and guiding structure 22. Each of the blades 33 is provided with an upstanding deflection element rigidly connected to the upper surface thereof along the leading edge 33a of the blade. It will be noted that material passing through the frusto-conical member 22 will be funneled towards the rotor mechanism 29 and will be thrown by the centrifugal force of the rotor mechanism to spread the material evenly to all parts of the bin. The deflector element 34 along the leading edge of the blade also serves to facilitate spreading and distribution of the granular material.

Means are also provided for imparting rotative movement to the rotor mechanism 29 and this means includes a fan mechanism 35 which is rigidly connected to the rotor mechanism and is spaced vertically thereof. It will be noted that fan mechanism 35 includes an inner annular frame element 36 which extends around the exterior of the frusto-conical member 22 intermediate the ends thereof and is radially spaced outwardly therefrom. Fan mechanism 35 also includes an outer annular frame element which is interconnected to the inner frame element 36 by means of a plurality of substantially flat overlapping inclined blades 38. Referring now to FIG. 2, it will be seen that the inner frame element 36 is provided with a plurality of circumferentially spaced tabs 39, each of which has a depending substantially straight post 40 rigidly connected thereto. These posts have their lowermost ends rigidly connected as by welding to the deflector elements 34 of certain of the blades 33. Thus the fan mechanism is rigidly connected to and spaced above the rotor mechanism 29.

In operation, the rotary distributing apparatus 20 will be detachably connected and suspended from the periphery of the material inlet 14 by securing the longer arm 25 of the brackets 23 to the annular flange 14a of the material inlet. A particulate material may be fed to the bin 10 by any conventional means, such as an elevator mechanism 41 which is comprised of an elongate housing 42 having an auger conveyer 43 rotatably journaled therein. The elevator mechanism will be provided with a discharge spout 44 which will be positioned above the material outlet of the bin structure 10 for discharge thereinto. Although the size and shape of the bin structure 10 may vary, it should be pointed out that conventional bin structures are approximately 21 feet in diameter. It is also pointed out that prior to the loading operation, the blower mechanism 19 will be energized and will be producing a continuous stream of heated air blowing upwardly through the interior of the bin. As the material is discharged through the spout 44 of the elevator mechanism 41, the material will be directed in a funneling manner through the material receiving and guiding structure 22 and will be discharged upon the rotor mechanism 29. However, the rotor mechanism will be rotated prior to the discharge of material thereagainst because of the action of the upwardly moving stream of air impinging against the fan mechanism 35. The wind mill construction of the fan mechanism 35 is such that when the upwardly moving current of air impinges against the air foil blades 38 the fan mechanism will be caused to rotate rapidly at rate of approximately four to five hundred r.p.m. Since the rotor mechanism 29 is rigidly connected to the fan mechanism 35, the rotor mechanism will rotate at the same rate. The material passing through the material receiving and guiding structure 22 will be directed downwardly to fall upon the rapidly rotating distributor blades 33, the rotor mechanism 29 revolving in the direction indicated by the arrow in FIG. 3. The material upon the distributor blades 33 will be temporarily retained thereupon and be impelled outwardly by the centrifugal force. The upstanding deflector elements 34 affixed to the distributor blades 33 adjacent their trailing edge facilitates widespread distribution of the material by striking and deflecting some of the material as it falls through the frusto-conical structure 22 and as the material is flung or moves outwardly and rearwardly from the blades. It should be pointed out that the rotation of the rotor mechanism 29 is facilitated by sealed ball-bearing construction of the hub 30.

Referring again to FIG. 1, it will be noted that there is an annular space around the material receiving and guiding structure 22 so that the upwardly moving air may be discharged through the material inlet 14. Thus, the suspended light chaff material will also be conveyed rapidly outwardly through the material inlet by the air entrained stream of heated air so that my rotary distributing apparatus also serves to clean grain while simultaneously distributing the grain. It is also pointed out that my novel rotary distributor apparatus may be readily controlled by merely opening the access doors 16 which in effect serves or functions as a damper during the loading operation.

It will be seen that a different embodiment of my rotary distributor apparatus is illustrated in FIGS. 4 and 5 and the embodiment shown therein is designated in its entirety by the reference numeral 50. This rotary distributing apparatus 50 includes a support 51 comprised of a frame 52 including a plurality of L-shaped frame members 53. Each of the frame members 53 includes a substantially horizontally disposed leg 54 and a vertically disposed leg 55. The terminal portions of the former being interconnected to define the symmetrical open frame work 52.

Means are provided for supporting the frame work 52 in suspended relation upon the peripheral flange 14a of material inlet 14. This means includes a plurality of support bars 56 each being rigidly secured to the vertically extending leg of one of the frame members 53 and extending outwardly therefrom and being adapted to be positioned upon the outwardly extending annular flange 14a of the material inlet 14. The frame 52 is also provided with a plurality of arcuate inwardly extending support elements 57, each of which is rigidly connected to the vertically extending legs 55 of each frame member 53 and which serves to provide a support for detachably supporting an inverted frusto-conical material receiving and guiding member 58. It will be noted that the juncture of the inner terminal portions of the horizontally disposed legs 54 of each frame member 53 are interconnected to a bearing 59 as best seen in FIG. 4. It will be noted that this bearing structure 59 is provided with a base plate 60 and is secured to the horizontally extending legs 54 of frame members 53 and it will also be noted that the bearing 59 is provided with a hollow bore for receiving a vertically disposed shaft 61 therein. A rotor mechanism 62 is journaled for rotation about the shaft 61 and includes a hub 63 having a plurality of substantially vertically disposed downwardly inclined distributor blades 64 radiating outwardly therefrom. Again referring to FIG. 4 it will be seen that material which is fed through the material receiving and guiding structure 58 will be directed in a funneling manner towards the rotor mechanism 62 and the rapidly whirling motion of the vertically disposed distributor blades will strike and spread the particulate material evenly to all parts of the material of the bin structure.

Means are provided for imparting rotative movement to the rotor mechanism 62 and like the embodiment of FIGS. 1 to 3 includes an air-driven fan mechanism 65 which is rigidly interconnected in co-axial relation to the rotor mechanism 62.

Fan mechanism 65 includes an annular rim or frame element 66 which is fixedly connected to terminal portions of the blades 64 and which extends upwardly therefrom, as best seen in FIG. 4. An annular frame is provided with a plurality of substantially flat airfoil blades 67 which are detachably secured thereto and which are arranged in circumferentially overlapped relationship. Each of the airfoil blades 67 is provided with a threaded shank 68 which is adapted to extend through an aperture in the annular ring 66, the shank being threadedly engaged by a nut 69 for rigid connection of the airfoil blade to the annular frame 66. This detachable and adjustable connection of each of the air blades 67 to the inner frame 66 to permit angular adjustment of the blades so that the r.p.m. of the fan mechanism may be readily varied.

The operation of the embodiment illustrated in FIGS. 4 and 5 is similar to that illustrated in FIGS. 1 to 3 so that grain discharged from a conventional elevator mechanism 41 will be fed into the material inlet 14 of a bin structure 10 and will be funneled through the material receiving and guiding structure 58. This material will be discharged against the rotor mechanism 62 to be rapidly and widely distributed throughout the interior of the bin 10. In this connection it should be pointed out that the fan mechanism 65 will be caused to rotate by the action of the upwardly moving stream of heated air impinging against the airfoil blades 67. The blower mechanism, of course, will be energized prior to the unloading of the material into the bin so that the rotor mechanism will be rapidly rotating prior to the passage of material through the frusto-conical member 58. It is also pointed out that inasmuch as the fan mechanism 65 in the embodiment shown in FIGS. 4 and 5 is disposed above the rotor mechanism 62 and since the fan mechanism is disposed radially outwardly from the rotor mechanism 62, there will also be a cleaning action effected by the distributor apparatus so that the air entrained chaff will be discharged around the material receiving and guiding structure 58.

It will be noted from the above description that I have provided a rotary distributing apparatus for use with conventional material storing and drying structures for causing even and efficient distribution of the material throughout the interior of the receptacle during the loading of the receptacle.

It will be noted that my uniquely constructed rotary distributor apparatus is readily adaptable for use with conventional grain bins and utilizes as the means for supplying rotary power thereto the upwardly moving stream of air produced by the blower mechanism associated with conventional storage and drying bins.

It will also be noted that my rotary distributing apparatus serves to simultaneously clean the grain by removing the lightweight chaff material therefrom during the loading operation.

It will therefore be seen that my uniquely constructed rotary distributor apparatus not only serves to clean and effectively distribute the material throughout the bin but also utilizes as a means of power the forced air present in conventional storage receptacles.

Thus, it will be seen that my novel rotary distributor apparatus is not only of simple and inexpensive construction and operation but that it functions in a more efficient manner than any heretofore known comparable device.

It will of course be understood that various changes may be made in the form, details, arrangement and proportions of the various parts without departing from the scope of my invention.

What is claimed is:

1. Forced air-driven distributor apparatus for use in distributing particulate material into bulk receivers of the type having an opening in the top thereof through which the material is loaded and having a blower mechanism for blowing heated air upwardly through the bulk receiver for drying the particulate material disposed therein, said forced air-driven apparatus including a support adapted to be suspended from the periphery of the opening in the bulk receiver and depending into the latter, a bladed rotor mechanism rotatably mounted on said support for rotation relative thereto about a substantially vertical axis, said bladed rotor mechanism having a plurality of radially arranged, circumferentially spaced blades so that adjacent of said blades define a vertically extending unobstructed space therebetween which is coextensive radially of the blade, said rotor mechanism when rotated causing uniform distribution of the particulate material throughout the interior of the bulk receiver as the material is loaded through the opening, and a forced air-driven fan mechanism mounted within said bulk receiver for rotation about a substantially vertical axis and being operatively connected to said rotor mechanism for imparting rotative movement thereto, said fan mechanism being caused to rotate by the action of the air moving upwardly through the bulk receiver whereby the rotor mechanism will be rotated during operation of the blower mechanism.

2. Forced air-driven distributor apparatus for use in distributing particulate material into bulk receivers of the type having an opening in the top thereof through which the material is loaded and having a blower mechanism for blowing heated air upwardly through the bulk receiver for drying the particulate material disposed therein, said forced air-driven apparatus including a support adapted to be suspended from the periphery of the opening in the bulk receiver and extending into the latter, said support including a material receiving and guiding structure for directing material downwardly therethrough, a bladed rotor mechanism rotatably mounted on said support and positioned immediately below said material receiving and guiding structure for rotation relative thereto about a substantially vertical axis, said bladed rotor having a plurality of radially arranged blades being circumferentially spaced apart so that adjacent of said blades define a vertically unobstructed space therebetween and below said material receiving and guiding structure, said bladed rotor when rotated causing uniform distribution of the particulate material through the interior of the bulk receiver as the material is loaded through the opening, a forced air-driven fan mechanism vertically spaced above and fixedly connected in coaxial relation with said rotor mechanism for rotation therewith, said fan mechanism having an outer periphery extending outwardly beyond a periphery of the rotor mechanism and being caused to rotate by the action of air moving upwardly through the bulk receiver whereby the rotor mechanism will be rotated during operation of the blower mechanism.

3. Forced air-driven distributor apparatus for use in distributing particulate material into bulk receivers of the type having opening in the top thereof through which the material is loaded and having a blower mechanism for blowing heated air upwardly through the bulk receiver for drying the particulate material disposed therein, said forced air-driven apparatus comprising a support adapted to be suspended from the periphery of the opening in the bulk receiver and extending into the latter, said support including a substantially vertically disposed material receiving and guiding structure for directing material downwardly therethrough, a rotor mechanism rotatably supported below said material receiving and guiding structure in close proximity thereto, said rotor mechanism including a hub having a cross-sectional area substantially less than the cross-sectional area of said material receiving and guiding structure and having a plurality of blades affixed thereto and extending radially outwardly therefrom, said blades being circumferentially spaced apart so that adjacent of said blades define a vertically unobstructed space therebetween and extending outwardly from the hub, whereby said blades when rotated cooperate with said structure for causing uniform distribution of the particulate material throughout the interior of the bulk receiver as the material is loaded through the opening, and a forced air-driven fan mechanism vertically spaced above and rigidly connected in coaxial relation with said rotor mechanism for rotation therewith, said fan mechanism being caused to rotate by the action of the air moving upwardly through the bulk receiver whereby the rotor mechanism will be rotated during operation of the blower mechanism.

4. The structure as defined in claim 3 wherein the blades of said fan mechanism include a support having a plurality of substantially flat blades adjustably connected thereto and extending radially outwardly therefrom.

5. The structure as defined in claim 3 wherein said material receiving and guiding structure is of substantially inverted frusto-conical shape.

6. Forced air-driven distributor apparatus for use in distributing particulate material such as grain into bulk receivers of the type having an opening in the top thereof through which the material is loaded and having a blower mechanism for blowing heated air upwardly through the bulk receiver for drying the particulate material disposed therein, said forced air-driven apparatus including an inverted substantially frusto-conically shaped material receiving and guiding structure adapted to be positioned within the bulk receiver and having means for releasably engaging portions of the bulk receiver adjacent the periphery of the opening for suspension and support of the structure therefrom, a rotor mechanism supported below and in close proximity to said material receiving and guiding structure and being rotatably connected thereto for rotation about a substantially vertical axis, said rotor mechanism including a hub having a cross-sectional area substantially less than the cross-sectional area of said material receiving and guiding structure and having a plurality of flat, substantially horizontally disposed, radially arranged distributor blades affixed thereto, said blades being circumferentially spaced apart so that adjacent of said blades define a vertically unobstructed space therebetween extending outwardly from said hub whereby said blades when rotated cooperate with said structure for causing uniform distribution of the particulate material throughout the interior of the bulk receiver as the material is loaded through the opening, and a forced air-driven bladed fan mechanism vertically spaced above and rigidly connected in coaxial relation with said rotor mechanism for rotation therewith, said fan mechanism encircling said material receiving and guiding structure in radially spaced relation thereto and extending outwardly beyond the periphery of the bladed rotor mechanism and being caused to rotate by the action of air moving upwardly through the bulk receiver whereby said rotor mechanism will be rotated during operation of blower mechanism.

7. The structure as defined in claim 6 wherein each of the blades of said rotor mechanism are provided with a deflector element, each of which is fixedly connected with and extends vertically upwardly from the leading edge of its associated blades.

References Cited in the file of this patent
UNITED STATES PATENTS
3,001,465    Donelson _____ Sept. 26, 1961